United States Patent
Reynolds et al.

(10) Patent No.: US 9,865,981 B2
(45) Date of Patent: Jan. 9, 2018

(54) FIBER LASER PACKAGING

(71) Applicant: NLIGHT, INC., Vancouver, WA (US)

(72) Inventors: Mitchell Reynolds, Vancouver, WA (US); Aaron W. Brown, Vancouver, WA (US)

(73) Assignee: NLIGHT, INC., Vancouver, WA (US)

( * ) Notice: Subject to any disclaimer, the term of this patent is extended or adjusted under 35 U.S.C. 154(b) by 0 days.

(21) Appl. No.: 15/341,776

(22) Filed: Nov. 2, 2016

(65) Prior Publication Data

US 2017/0141527 A1    May 18, 2017

Related U.S. Application Data

(60) Provisional application No. 62/257,164, filed on Nov. 18, 2015.

(51) Int. Cl.
  *H01S 3/067*    (2006.01)
  *H01S 3/04*     (2006.01)

(52) U.S. Cl.
  CPC ........ *H01S 3/06704* (2013.01); *H01S 3/0405* (2013.01)

(58) Field of Classification Search
  CPC ..... G02B 6/02; H01S 3/067; H01S 3/094096; H01S 3/1618

USPC ............................................ 372/6
  See application file for complete search history.

(56) References Cited

U.S. PATENT DOCUMENTS

| | | | |
|---|---|---|---|
| 9,120,286 B2 | 9/2015 | Dailey | |
| 9,665,049 B2* | 5/2017 | Oshima | G03G 15/2057 |
| 2016/0121598 A1* | 5/2016 | Zhou | B41F 3/54 |
| | | | 101/216 |
| 2016/0252854 A1* | 9/2016 | Oshima | G03G 15/2057 |
| | | | 399/333 |

* cited by examiner

*Primary Examiner* — Tuan Nguyen
(74) *Attorney, Agent, or Firm* — Schwabe, Williamson & Wyatt P.C.

(57) ABSTRACT

Packaging for a fiber laser includes a conduit surrounding the fiber laser and a thermally conductive compound filling a gap between the fiber laser and the conduit setting the fiber laser within the conduit. The fiber laser may have a substantially circular first cross section having a first diameter and the conduit may have a substantially circular second cross section having a second diameter larger than the first diameter of the fiber laser. The conduit may have a splice window cut out from a wall of the conduit and optical potting compound may fix a portion of the fiber laser under the splice window.

17 Claims, 7 Drawing Sheets

FIBER LASER PACKAGING

RELATED APPLICATIONS

This application is a non-provisional of and claims priority benefit to U.S. provisional patent application No. 62/257,164, filed Nov. 18, 2015, all of which is incorporated herein by reference in its entirety.

TECHNICAL FIELD

The present disclosure relates to fiber laser packaging.

BACKGROUND

A fiber laser is a type of optical laser that includes a clad fiber rather than a rod, a slab, or a disk. Fiber lasers reflect light through an optical cavity such that a stream of photons stimulates atoms in a fiber that store and release light energy at useful wavelengths. Fiber type, core size, numerical aperture, refractive index, and doping of the fiber contribute to the range and possibilities of light propagation using fiber lasers.

Figure 1A:
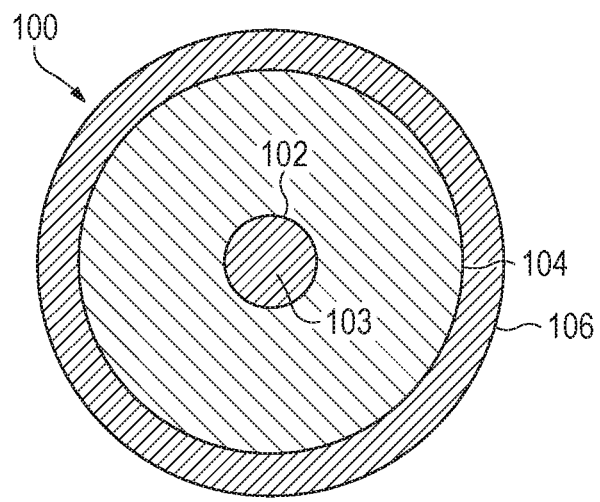
Figure 1B:
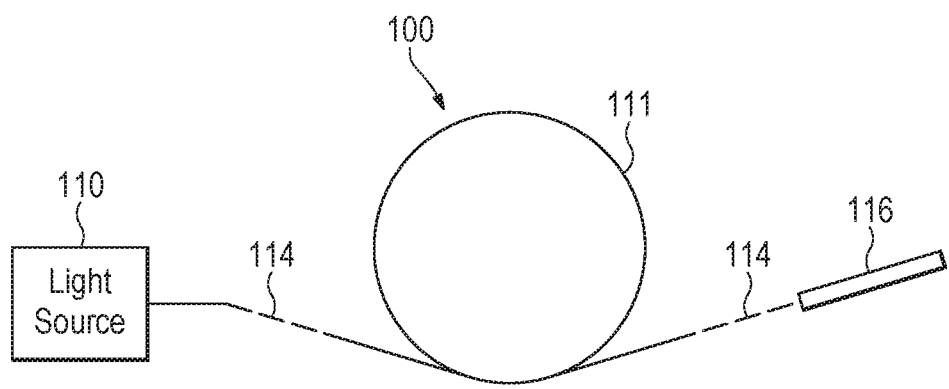

A fiber laser 100 is shown in FIGS. 1A and 1B. Fiber laser 100 may include a core 102 surrounded by a cladding 104 and a protective coating 106. Core 102 may have a different refractive index than cladding 104. Depending on size, refractive index, and wavelength, core 102 may be single mode or multi-mode although single mode is preferred for many applications. Core 102 may be made of a variety of materials including well-known silica-based materials. Core 102 may include a dopant 103 from the lanthanide series of chemicals including Erbium or Ytterbium that release light energy at useful wavelengths. Fiber laser 100 may be illuminated by a light source 110, e.g., a laser diode. Light source 110 may be a single diode, an array of diodes, or many separate pump diodes, each with a fiber going into a coupler. Fiber laser 100 may further include a grating 114 at both ends of coil 111 to manipulate or otherwise filter light source 110 and deliver it as a laser beam 116. Fiber laser 100 may be used in a variety of applications including welding heavy sheets of metal, cutting high-strength steel used to produce automobiles, cutting and drilling concrete, and microscale and nanoscale machining.

In some applications, fiber laser 100 may have a length between several millimeters and hundreds of meters, most commonly in the 1-30 meter range. Fiber laser 100 may be coiled 111 with a generally permissible bend radius in the 10-20 millimeters. Fiber laser 100 may release heat during operation that requires efficient heat removal to avoid damaging core 102 or cladding 104.

Fiber laser 100 may have a relatively small diameter that is susceptible to breakage during handling, e.g., coiling, splicing, cleaving, coating, transporting, packaging, and the like. Breakage results in undesirable yield loss, which may be avoided by properly packaging fiber laser 100. Further, high power fiber laser applications often require robust thermal management that include the use of thermally conductive potting compounds (not shown) applied to grooves machined into a metal plate or other housing (not shown) that support or hold in place fiber laser 100. In a situation where fiber laser 100 needs repair, fiber laser 100 is accessed by first processing the machined metal plate to remove the potting compound. The machined metal plate may be re-used or scrapped after processing. Further yet, an alternative to using potting compound in packaging fiber laser 100 involves using tape, e.g., kapton tape, to restrain fiber laser 100 against the grooves of the machined metal plate or other housing. But using tape as a restraint is often aesthetically displeasing leading to a perception of poor workmanship. A need remains for an improved protective, cost efficient, and aesthetically pleasing packaging for fiber laser 100.

BRIEF DRAWINGS DESCRIPTION

Figure 2A:
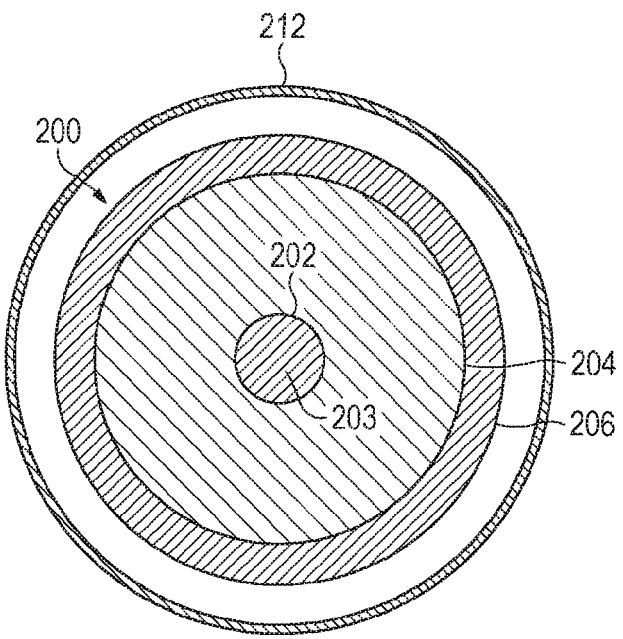
Figure 2B:
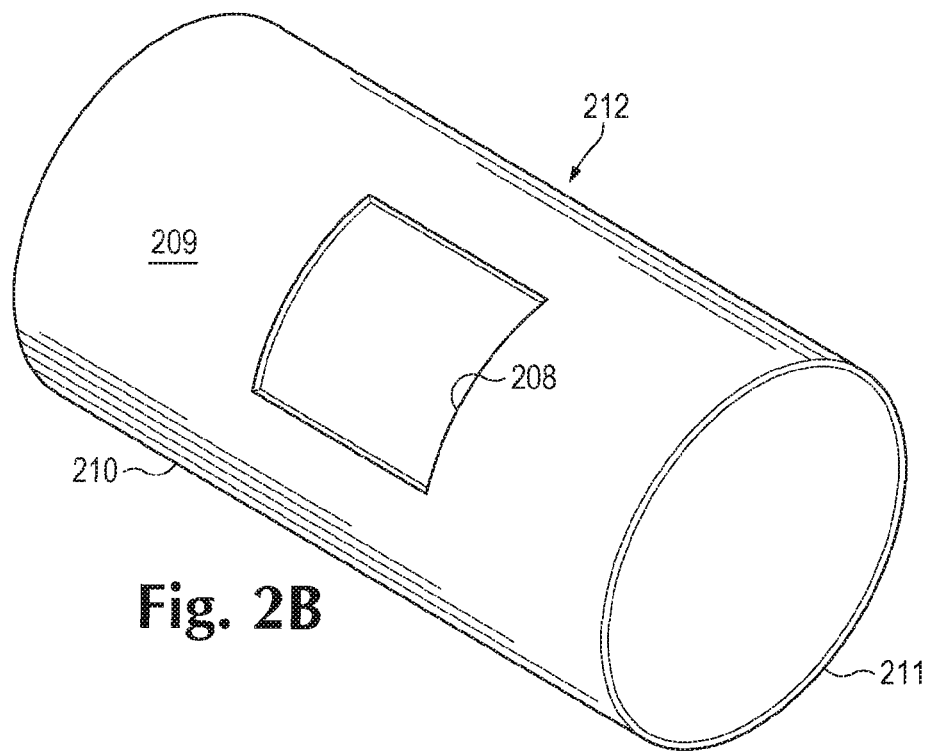
Figure 2C:
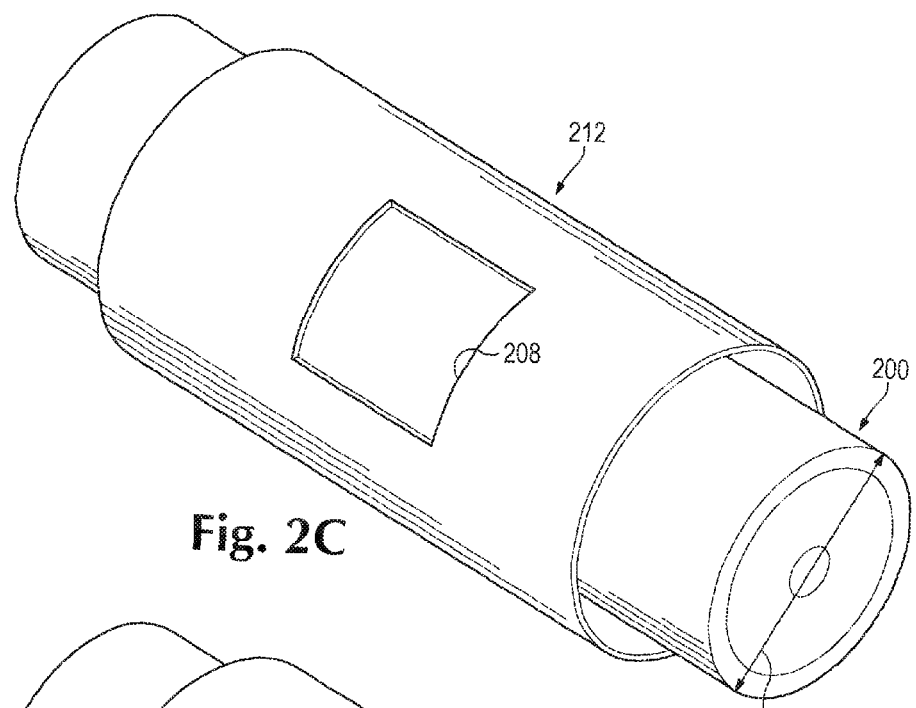
Figure 2D:
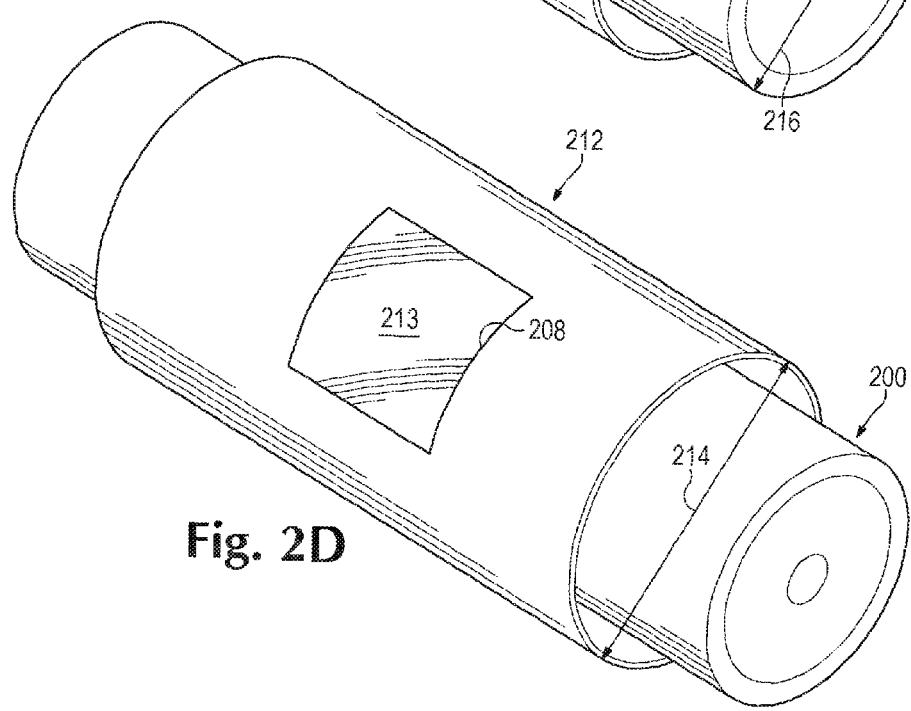
Figure 2E:
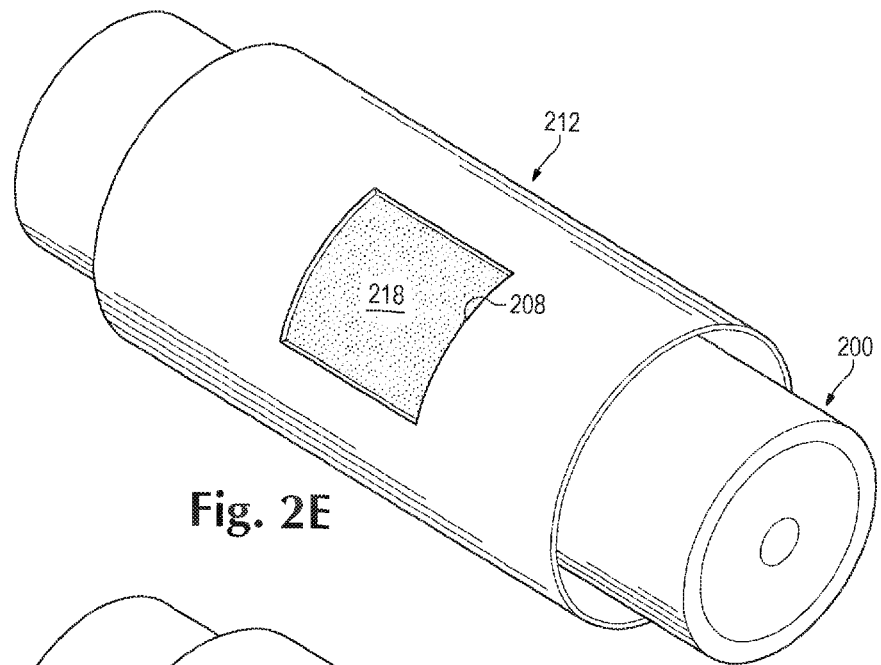
Figure 2F:
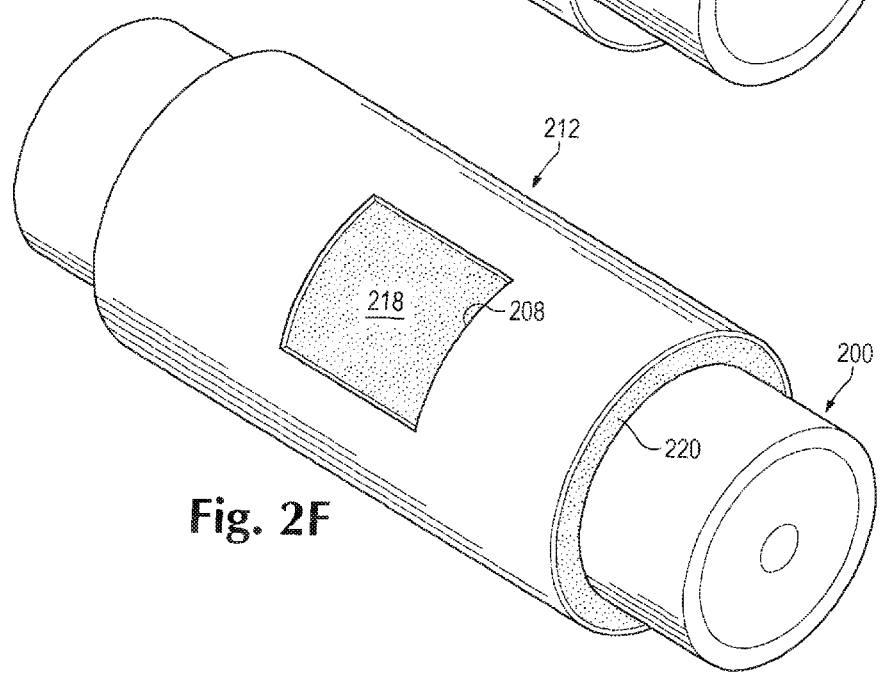
Figure 2G:
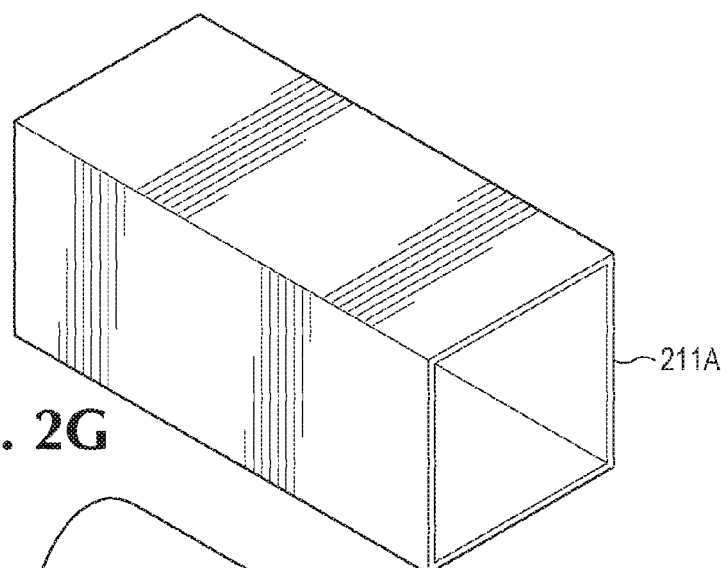
Figure 2H:
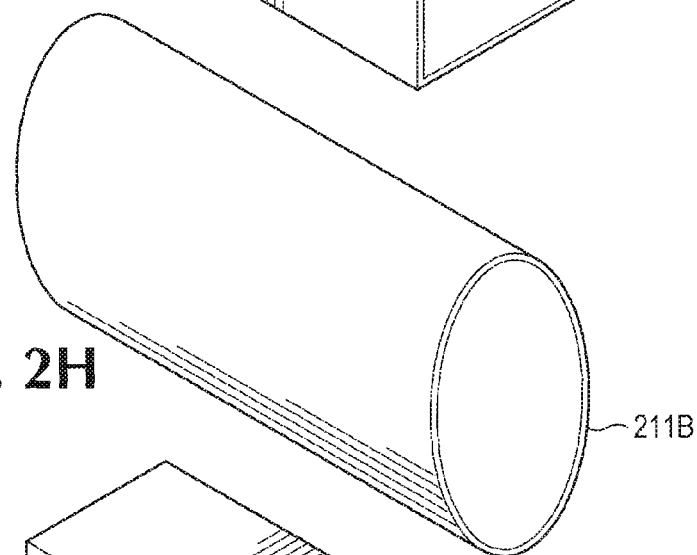
Figure 2I:
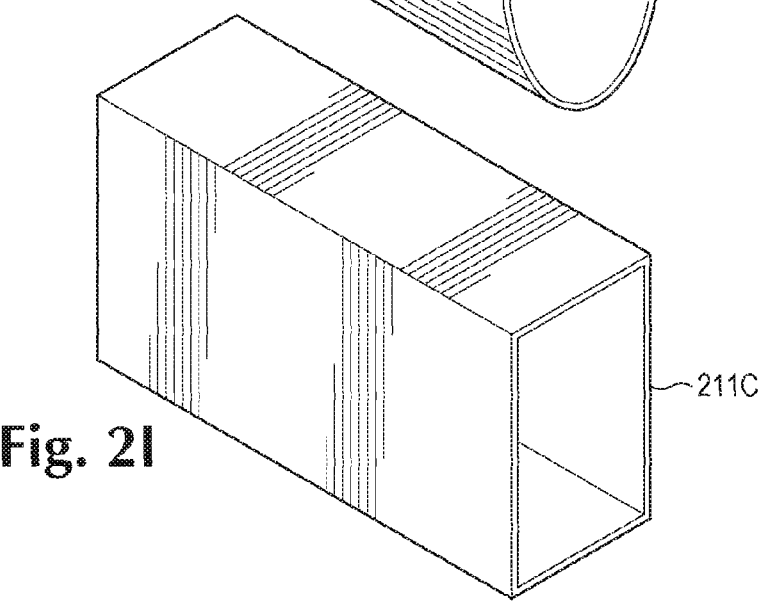
Figure 2J:
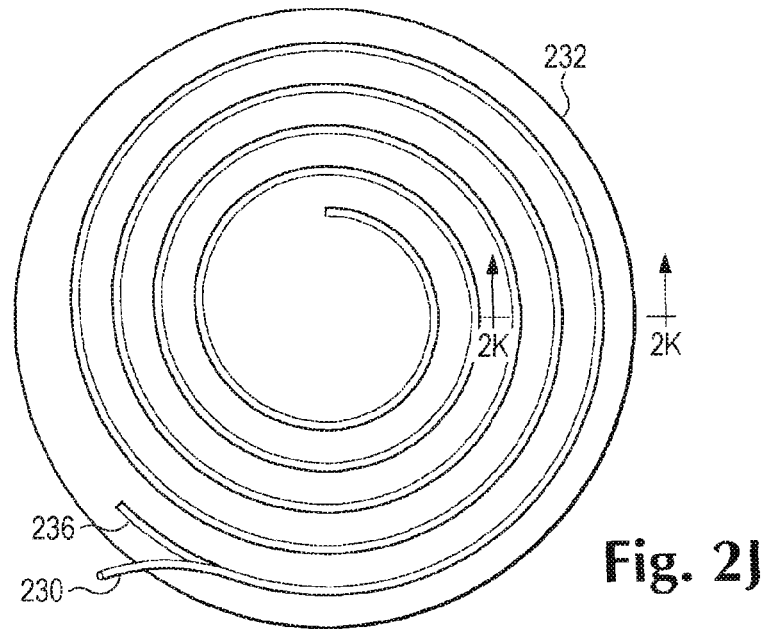
Figure 2K:
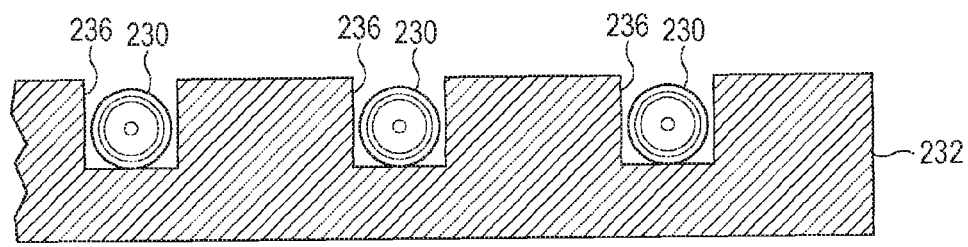
Figure 2L:
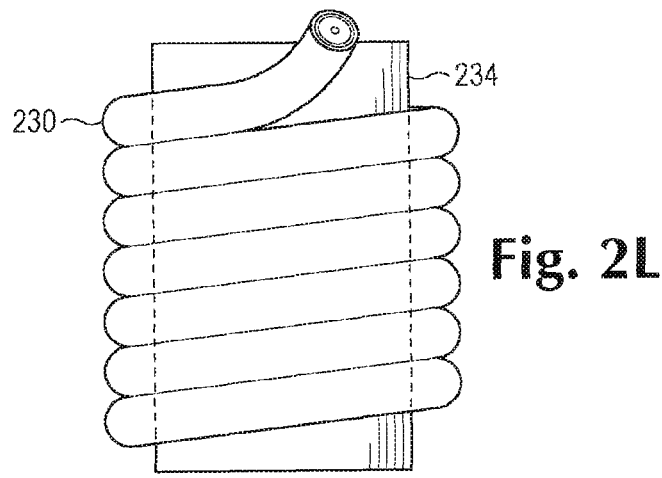
Figure 3:
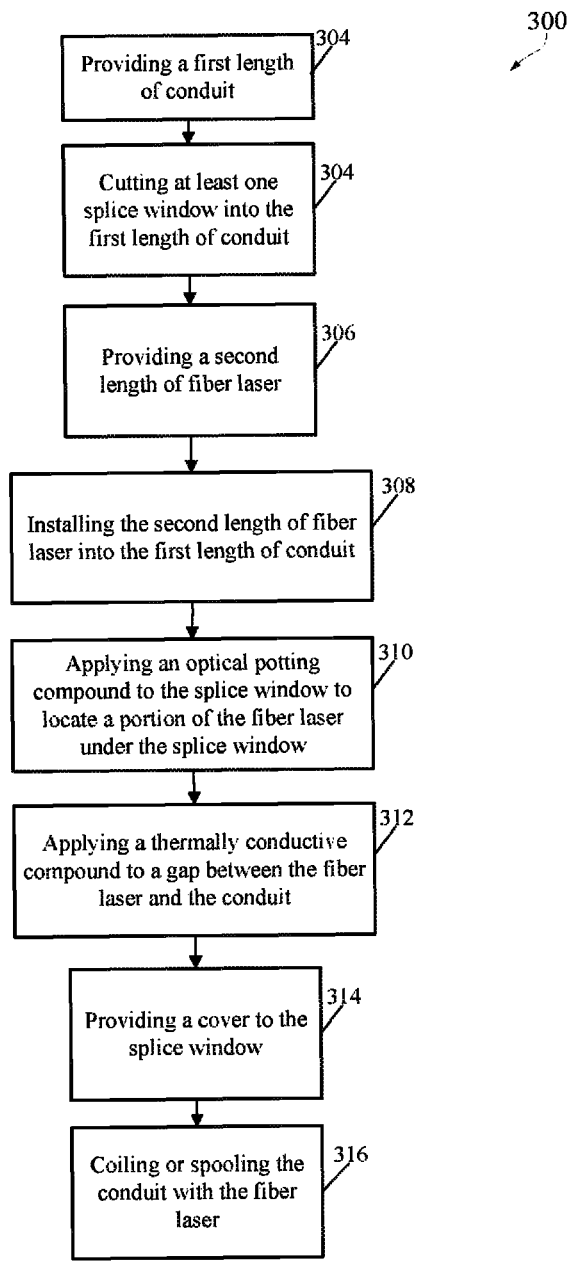

The present disclosure describes various embodiments that may be understood and fully appreciated in conjunction with the following drawings:

FIG. 1A diagrams an embodiment of a cross section of a fiber laser according to the present disclosure;

FIG. 1B diagrams an embodiment of a fiber laser according to the present disclosure;

FIG. 2A diagrams an embodiment of a cross section of a fiber laser according to the present disclosure;

FIG. 2B diagrams an embodiment of a conduit according to the present disclosure;

FIGS. 2C-F diagram embodiments of a fiber laser in a conduit according to the present disclosure;

FIGS. 2G-I diagram embodiments of a cross-section of a conduit according to the present disclosure;

FIGS. 2J-L diagram embodiments of a coiled fiber laser in a conduit according to the present disclosure; and FIG. 3 diagrams an embodiment of a method for packaging a fiber laser according to the present disclosure.

DETAILED DESCRIPTION

The present disclosure describes embodiments with reference to the drawing figures listed above. Persons of ordinary skill in the art will appreciate that the description and figures illustrate rather than limit the disclosure and that, in general, the figures are not drawn to scale for clarity of presentation. Such skilled persons will also realize that many more embodiments are possible by applying the inventive principles contained herein and that such embodiments fall within the scope of the disclosure which is not to be limited except by the claims.

FIG. 2A diagrams an embodiment of a cross-section of a fiber laser 200 according to an embodiment of the present disclosure. Fiber laser 200 may have a similar construction to fiber laser 100 described with reference to FIGS. 1A and 1B, including a core 202 surrounded by a cladding 204 and a protective coating 206. Core 202 may have a different refractive index than cladding 204. Core 202 may be made of a variety of materials including well-known silica-based materials. Core 202 may include a dopant 208 from the lanthanide series of chemicals including Erbium or Ytterbium that release light energy at useful wavelengths. Fiber laser 200 may operate at any power level known to a person of ordinary skill in the art, e.g., greater than 10 kW/mm$^2$.

FIG. 2B diagrams an embodiment of a conduit, packaging, or tubing 212 for fiber laser 200. FIGS. 2C-F diagram embodiments of fiber laser 200 in conduit 212. FIGS. 2G-I diagram embodiments of a cross-section of conduit 212. FIGS. 2J-L diagram embodiments of a coiled fiber laser in a conduit according to the present disclosure.

Referring to FIGS. 2A-L, conduit 212 may have a substantially cylindrical shape 210 with a circular cross section 211. In other embodiments, cross section 211 of conduit 212 may any shape known to a person of ordinary skill in the art, e.g., square 211A, oval 211B, rectangular 211C, or the like as shown in FIGS. 2G-I, respectively. A person of ordinary skill in the art should recognize that cross section 211 may have any shape with up to n sides.

In an embodiment, conduit 212 may be substantially hollow along its length with any known wall thickness appropriate for the intended application and sufficient to protect fiber laser 200 from damage during handling, packaging, or transport. A person of ordinary skill in the art should recognize that conduit 212 may have any wall thickness, e.g., 0.001 to 0.04 inches, and may be based on conduit size, shape, material, and the like. Conduit 212 may have a wall thickness that minimizes thermal resistance while providing adequate mechanical strength and protection of the fiber laser.

Conduit 212 may be made of any material that is capable of protecting fiber laser 200 while remaining flexible, malleable, or otherwise capable of being formed either by hand or by machine into any of a variety of shapes appropriate for transporting and handling fiber laser 200. In an embodiment, conduit 212 may be made of aluminum, copper, steel, or any other metal. Conduit 212 may be shaped into a coil 230 on a plate 232 or a spool 234 having any diameter that avoids damage to fiber laser 200, e.g., a coil diameter greater than the generally permissible bend radius of 10-20 millimeters for fiber laser 200. Conduit 212 may have any length appropriate for the application as is well known to a person of ordinary skill in the art, e.g., 1-50 meters.

In an embodiment, conduit 212 may include a splice window 208 having any shape known to a person of ordinary skill in the art, e.g., square (shown), oval, circular, rectangular, or the like. Splice window 208 may be cut out of wall 209 of conduit 212 using any means known to a person of ordinary skill in the art, e.g., well-known or specialized tools or machines. Splice window 208 may have any size known to a person of ordinary skill in the art to allow for dumping or striping unabsorbed pump light from fiber laser 200. Pump dumps are well known to persons of ordinary skill in the art for providing localized stripping of unabsorbed or excess pump light from, e.g., light source 110 (FIGS. 1A and 1B), to protect components upstream of the active end of fiber laser 200. In an embodiment, splice window 208 is long enough to allow potting of the splice between two lengths of fiber laser 200. Splice window 208 may have a shape that reduces gaps or limits exposure for thermal or mechanical protection concerns.

In an embodiment, plural splice windows 208 may be located along a length of conduit 212. Plural splice windows 208 may be evenly or unevenly spaced along a length of conduit 212 and may be positioned inline or otherwise along a length of conduit 212. Splice window 208 may include a window cover 213 to protect fiber laser 200 from physical or other kind of damage. Window cover 213 may be made of any material known to a person of ordinary skill in the art as appropriate for the application, e.g., metal or plastic.

In an embodiment, fiber laser 200 is installed in conduit 212 such that fiber laser 200 is substantially surrounded or enclosed by conduit 212. Conduit 212 may have a diameter 214 that is larger than a diameter 216 of fiber laser 200 to allow fiber laser 200 to fit within conduit 212. Fiber laser 200 may be installed in conduit 212 by any means known to a person of ordinary skill in the art including, e.g., threading fiber laser 200 through conduit 212 either by hand or by machine. Fiber laser 200 may alternatively be installed in conduit 212 using a vacuum or other mechanized means to draw fiber laser 200 through conduit 212. By doing so, conduit 212 may protect fiber laser 200 from damage due to breakage during handling, e.g., coiling, splicing, cleaving, coating, transporting, packaging, and the like. Conduit 212 may be made of any material known to a person of ordinary skill in the art, including metals such as aluminum, copper, steel, or the like, that allow to improved manufacturability including improved malleability, machinability, and so on.

In an embodiment, optical potting compound 218 may be added to splice window 208 after installation of fiber laser 200 in conduit 212. Note that FIG. 2E is shown without window cover 213 to reveal optical potting compound 218 as applied to fiber laser 200 through splice window 208. Window cover 213 may cover splice window 208 and optical potting compound 218 after its application. Potting compound 218 may help fix or locate fiber laser 200 under splice window 208. Potting compound 218 may be any adhesive, epoxy, resin, or other composition that is known to a person of ordinary skill in the art, e.g., silicon-based compounds. Potting compound 218 may be thermally conductive and may guide or strip the light depending on the design or purpose of the splice.

Further, in an embodiment in which conduit 212 is made of a conductive metal such as aluminum, copper, or steel, conduit 212 may act as a heat sink to remove heat from fiber laser 200 during operation. In these applications, it may be desirable for diameter 214 of conduit 212 to be relatively close in size to diameter 216 of fiber laser 200 to thereby improve the thermal coupling between conduit 212 and fiber laser 200. To further improve the thermal coupling between conduit 212 and fiber laser 200, a thermally conductive compound 220 may be added to fill the gap between conduit 212 and fiber laser 200. Thermally conductive compound 220 may be any thermally conductive compound, resin, or other composition that is known to a person of ordinary skill in the art. Thermally conductive compound 220 may be applied by hand or using known or specialized tools. Thermally conductive compound 220 may include particles of various materials to enhance thermal conductivity. Thermally conductive compound 220 may also be intended to guide or strip light from the protective coating of the fiber laser, depending on the application. Fit between fiber laser 200 and conduit 212 may be designed or controlled to improve manufacturability and/or performance. Thermally conductive compound 220 may be applied via injection method under pressure or other means such as filling small open ports (not shown) along the length of the conduit. In an embodiment, for a given set of materials, a tighter fit between laser fiber 200 and conduit 212 will generally provide better heatsinking (lower fiber temperatures) because the thickness of potting compound will be reduced.

Referring to FIGS. 2J-K, conduit 212 enclosing fiber laser 200 may be coiled into a coil 230 and placed within grooves 236 of a plate 232. Plate 232 may be made of any material known to a person of ordinary skill in the art, e.g., metal, plastic, and the like. Grooves 236 may be machined into plate 232 or they may be molded into plate 232. Grooves 236 may be sized to receive conduit 212 enclosing fiber laser 200. Conduit enclosing fiber laser 200 may be coiled in plane around grooves 236 of plate 232. Alternatively, as shown in FIG. 2L, conduit 212 enclosing fiber laser 200 may be coiled vertically around spool 234. A person of ordinary skill in the art should recognize that many other arrangements for coiling conduit 212 enclosing fiber laser 200 come within the scope of the present disclosure.

FIG. 3 diagrams an embodiment of a method 300 for packaging a fiber laser according to the present disclosure. Referring to FIGS. 2A-I and FIG. 3, method 300 includes, at 302, providing a first predetermined length of conduit 212 by e.g., cutting a first length of conduit 212. Conduit 212 may be a hollow, substantially cylindrical length of aluminum, copper, or steel tubing. At 304, method 300 includes cutting splice window 208 into a wall 209 of conduit 212 such that at least portions of fiber laser 200 is visible under window 208 after its installation. At 306, method 300 includes providing a second predetermined length of fiber laser 200. Generally, the first predetermined length of conduit 212 may be longer than the second predetermined length of fiber laser 200 although this may vary as is well known to a person of ordinary skill in the art. At 308, method includes installing the second predetermined length of fiber laser 200 in the first predetermined length of conduit 212 using any means known to a person of ordinary skill in the art including threading, fishing, or otherwise inserting the fiber laser 200 into the conduit 212 by hand or using ordinary or specialized tools.

At 310, method 300 includes applying optical potting compound to the splice window 208 to fix or locate at least a portion of fiber laser 200 under splice window 208. At 312, method includes applying a thermally conductive compound to a gap between the fiber laser 200 and the conduit 212. At 314, method 300 includes adding a cover 213 to the splice window 208 to protect the optical potting compound and the fiber laser 200. At 316, method 300 includes coiling or spooling conduit 212 and fiber laser 200 onto a grooved plate or a spool.

Person of ordinary skill in the art will appreciate that that the present disclosure is not limited to what has been particularly shown and described hereinabove. Rather, the scope of the present disclosure includes both combinations and sub-combinations of the various features described hereinabove as well as modifications and variations which would occur to such skilled persons upon reading the foregoing description. Thus only the appended claims may limit the present disclosure.

The invention claimed is:

1. An apparatus, comprising:
a fiber laser;
a conduit surrounding the fiber laser;
at least one splice window cut out from a wall of the conduit; and
an optical potting compound filling a gap between the fiber laser and the conduit setting the fiber laser within the conduit; wherein the fiber laser has a power density of greater than 10 kW/mm$^2$; wherein a portion of the optical potting compound is used to fix a portion of the fiber laser in the splice window.

2. The apparatus of claim 1,
wherein the fiber laser comprises a substantially circular first cross section having a first diameter; and
wherein the conduit comprises a substantially circular second cross section having a second diameter larger than the first diameter of the fiber laser.

3. The apparatus of claim 2,
wherein the conduit comprises aluminum, copper, or steel.

4. The apparatus of claim 2,
wherein the conduit dissipates heat from the fiber laser during operation.

5. A method of packaging a laser fiber for a high power fiber laser application, the method comprising:
cutting a window into a length of tubing;
installing a length of the fiber laser within the tubing such that the tubing substantially surrounds the length of fiber laser where the fiber laser is visible through the window;
applying a thermally conductive compound to a gap between the length of fiber laser and the tubing; and
covering a portion of the fiber laser that that is visible through the window with a portion of the thermally conductive compound.

6. The method of claim 5,
wherein the fiber laser comprises a first diameter; and
wherein the tubing comprises a second diameter larger than the first diameter of the fiber laser.

7. The method of claim 5,
wherein the fiber laser has an operating power density greater than 10 kW/mm$^2$.

8. The method of claim 5,
wherein the tubing comprises aluminum, copper, or steel.

9. The method of claim 5, further comprising:
dissipating heat from the fiber laser through the tubing and the thermally conductive compound during operation of the fiber laser.

10. The method of claim 5, further comprising:
coiling the tubing on a plurality of coiled grooves of a circular plate.

11. The method of claim 5, further comprising:
winding the tubing around a spool.

12. A packaging system, comprising:
a laser fiber;
a hollow tubular conduit substantially surrounding the laser fiber; and
a conductive thermal compound thermally coupling the hollow tubular conduit to the laser fiber; wherein the fiber laser has a power density of greater than 10 kW/mm$^2$.

13. The packaging system of claim 12,
wherein the laser fiber comprises a substantially circular first cross-section having a first diameter.

14. The packaging system of claim 13,
wherein the hollow tubular conduit comprises a substantially circular second cross-section having a second diameter larger than the first diameter.

15. The packaging system of claim 14,
wherein the conductive thermal compound fills a gap between the hollow tubular conduit and the laser fiber.

16. The packaging system of claim 12,
wherein the hollow tubular conduit comprises aluminum, copper, or steel.

17. The packaging system of claim 12,
wherein the hollow tubular conduit comprises an outer surface having a window to the laser fiber.

* * * * *